United States Patent [19]
Vos et al.

[11] Patent Number: 5,675,635
[45] Date of Patent: Oct. 7, 1997

[54] SYSTEM AND METHOD FOR CONDUCTING POLL AT A PROCESSOR ASSOCIATED WITH THE ORIGINATING SWITCH

[75] Inventors: Benjamin Mark Vos, Penfield, N.Y.; Robert Eugene Dahman, Belton, Mo.; James Frank Ramacher; James David Setter, both of Olathe, Kans.; Minh Duy Khuc, Overland Park, Kans.

[73] Assignee: Sprint Communications Company L.P., Kansas City, Mo.

[21] Appl. No.: 590,090

[22] Filed: Jan. 24, 1996

[51] Int. Cl.⁶ ................................................. H04M 3/36
[52] U.S. Cl. .......................... 379/113; 379/67; 379/92; 379/112; 379/207
[58] Field of Search ........................... 379/67, 88, 89, 379/92, 201, 207, 265, 266, 309, 216, 230, 93, 111, 113, 112; 370/449

[56] References Cited

U.S. PATENT DOCUMENTS

| | | | |
|---|---|---|---|
| 4,151,370 | 4/1979 | Root | 379/92 |
| 4,160,125 | 7/1979 | Bower et al. | 379/92 |
| 4,451,700 | 5/1984 | Kempner et al. | 379/92 |
| 4,788,716 | 11/1988 | Zebe | 379/92 |
| 4,962,525 | 10/1990 | Beckh | 379/92 |
| 4,989,233 | 1/1991 | Schakowsky et al. | 379/92 |
| 5,056,086 | 10/1991 | Libonati | 379/88 |
| 5,060,256 | 10/1991 | Borbas et al. | 379/92 |
| 5,311,507 | 5/1994 | Bedrossian | 379/92 |
| 5,442,688 | 8/1995 | Katz | 379/205 |
| 5,448,632 | 9/1995 | Iyob et al. | 379/201 |
| 5,448,633 | 9/1995 | Jamaleddin et al. | 379/207 |
| 5,452,350 | 9/1995 | Reynolds et al. | 379/265 |
| 5,479,492 | 12/1995 | Hofstee et al. | 379/92 |
| 5,524,148 | 6/1996 | Morrisey | 379/207 |

Primary Examiner—Krista M. Zele
Assistant Examiner—Scott Wolinsky
Attorney, Agent, or Firm—Harley R. Ball; Michael J. Setter; Jed W. Caven

[57] ABSTRACT

A system and method for conducting a dial-in telephone poll prompts callers at remote terminals to participate in the poll by selectively dialing a telephone number corresponding to a specific response to the poll. Each call from a poll participant is received at a switch that is the originating switch for that call. The originating switch also receives caller data indicating the dialed number associated with the call. This caller data is forwarded to a processor associated with the originating switch for counting the number of calls placed to each telephone number associated with the poll. The associated processor may also include a polling table containing a list of telephone numbers associated with the poll and a corresponding list of message IDs. Upon receiving caller data from an originating switch, the associated processor increments a counter for the dialed number and returns a corresponding message ID to the originating switch. The message ID indicates the address of a prerecorded voice message stored at the originating switch. The voice message, which is played for the caller just prior to termination of the call, typically confirms that the caller's response has been recorded. After the polling session has ended, the results of the poll may be obtained from the associated processor.

17 Claims, 2 Drawing Sheets

SYSTEM AND METHOD FOR CONDUCTING POLL AT A PROCESSOR ASSOCIATED WITH THE ORIGINATING SWITCH

This invention relates in general to a system and method for operating a poll and, more particularly, to a system and method for processing telephone calls from poll participants who have selectively dialed one telephone number from a plurality of available telephone numbers wherein each telephone number represents a different response to the poll.

BACKGROUND OF THE INVENTION

The telephone is a well known tool for conducting polls or surveys. One method for conducting a poll is to present prospective participants with a choice of alternative responses to the poll along with a telephone number corresponding to each response. Individuals are then invited to participate in the poll by calling one of the telephone numbers corresponding to a specific response to the poll. These telephone numbers are typically 800 to 900 numbers. The specific telephone numbers may be broadcast or advertised by any method practical for communicating with prospective participants (e.g., radio, television, newspaper, or direct mail).

Currently, polls are handled by "centralized" systems. In these systems, calls for the poll are routed to a single site or a few sites where computers answer the calls, play messages to the callers, and tally the results. Typically, these sites are service bureaus and the computers are voice response units (VRUs). Since the calls are concentrated in the centralized system, problems such as increased traffic and congestion are encountered.

A centralized polling system can be operated in conjunction with an interexchange carrier (IXC). In this system, special handling numbers (e.g., 800 to 900 numbers) are assigned as the telephone numbers associated with responses to the dial-in poll. The service bureau handling the poll uses conventional 800 routing systems provided by the IXC to route calls for the poll to the service bureau sites. Typically, only a small number of the switches in the IXC terminate at the service bureau sites. This means that calls for the poll are often routed through multiple switches before they can be concentrated at the service bureaus.

Those skilled in the art are familiar with conventional 800 routing techniques employed by the IXC. The calls for the poll are initially received by a local exchange carrier (LEC) network that transfers the calls to a switch in the IXC network. This switch is known as the originating switch. The originating switch also receives the dialed number from the LEC through a signaling message. Upon receiving the 800 call, the originating switch forwards the dialed number to a processor associated with that switch. In current intelligent networks that employ Signaling System #7 (SS7), the processor is known as a Service Control Point (SCP).

The associated processor, or SCP, contains an internal look-up table which matches each 800 number with a translation number. The translation number is the routing instruction for the originating switch. In the case of a poll, this translation number indicates the service bureau that is handling calls for the poll. The translation number is sent to the originating switch, which uses the translation number to route the call over the IXC switching network to the switch that is connected to the service bureau. This switch is known as the terminating switch. This process is repeated for all of the calls for the poll. These calls may originate from various locations and at various originating switches. Calls for the poll are concentrated on the terminating switch.

The terminating switch is connected to the service bureau by trunks. The terminating switch provides the service bureau with the dialed numbers over the trunks using the well known Dialed Number Information Service (DNIS). The service bureau analyzes the dialed numbers to count the number of calls placed to each of the telephone numbers associated with the poll. The IXC also forwards the calls over the trunks to VRUs at the service bureau. The VRUs answer the calls and play prerecorded messages for the callers confirming receipt of the calls. The calls are then terminated.

Use of the centralized system described above in connection with dial-in telephone polls has resulted in substantial problems when a large volume of calls are placed in response to the poll and routed over the network to a limited number of terminating switches. At some point, the volume of calls exceeds the capacity of the switching network and creates a bottleneck in the network. When this happens, subsequent callers attempting to participate in the poll may be denied access to the polling operation. Typically, these callers will either encounter a busy signal or a prerecorded message asking them to call back later. Moreover, a bottleneck in the call traffic between two or more switches may rapidly increase congestion throughout the rest of the switching network until the entire network becomes overloaded and cannot handle any additional calls. In fact, other network users may also be denied access to the network when the volume of calls received in response to a poll overloads the switching network.

Often, the target audience of a poll may be the viewers of a particular television program, and it may be desirable to conduct the poll and broadcast the results of the poll during that television program. Prompting viewers to phone in their votes is one of the few practical ways to conduct a poll during television program that may last for only 30 minutes. Moreover, the probability that poll results are representative of the views of the entire target audience would be increased if the number of calls accepted from each caller (or from each calling number) is limited. In other words, the risk of an individual caller or household unduly influencing the outcome of the poll may be greatly reduced by screening incoming calls. Similarly, callers may be less likely to call the same telephone number over and over again if the caller must pay for the call (e.g., a 900 number). In any event, meaningful results may be obtained from a dial-in poll so long as the results are considered in the proper context.

SUMMARY OF THE INVENTION

The present invention is directed to a switching network wherein the polling operation is distributed throughout the network. The invention overcomes the problems and limitations of the centralized polling systems by enabling the switches to use a remote processor to tabulate poll results. This means that the calls do not need to be routed to any other switches or to a service bureau. This efficiency allows the system to handle larger numbers of calls without congesting the network.

In one embodiment, the invention is a telecommunications network for facilitating a poll. The invention comprises switches that receive the calls and telecommunications signaling related to the calls. The telecommunications signaling includes the telephone numbers that were used by the callers to place the calls and the telephone numbers of the callers themselves. The switches transmit queries including and based on the telephone numbers. The switches terminate the calls without routing the calls to another network element.

The invention also comprises a remote processor that receives the queries from the switches and tabulates poll results based on an analysis of the telephone numbers that have been associated with responses to the poll and that were used by the callers to place the calls. The switches and the remote processor are linked together.

In another embodiment, the remote processor identifies messages to play to the callers based on the analysis of the telephone numbers. The remote processor transmits responses to the switches identifying the messages. The switches receive the responses from the remote processor and play the messages to the callers.

BRIEF DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE DRAWINGS

Figure 1:
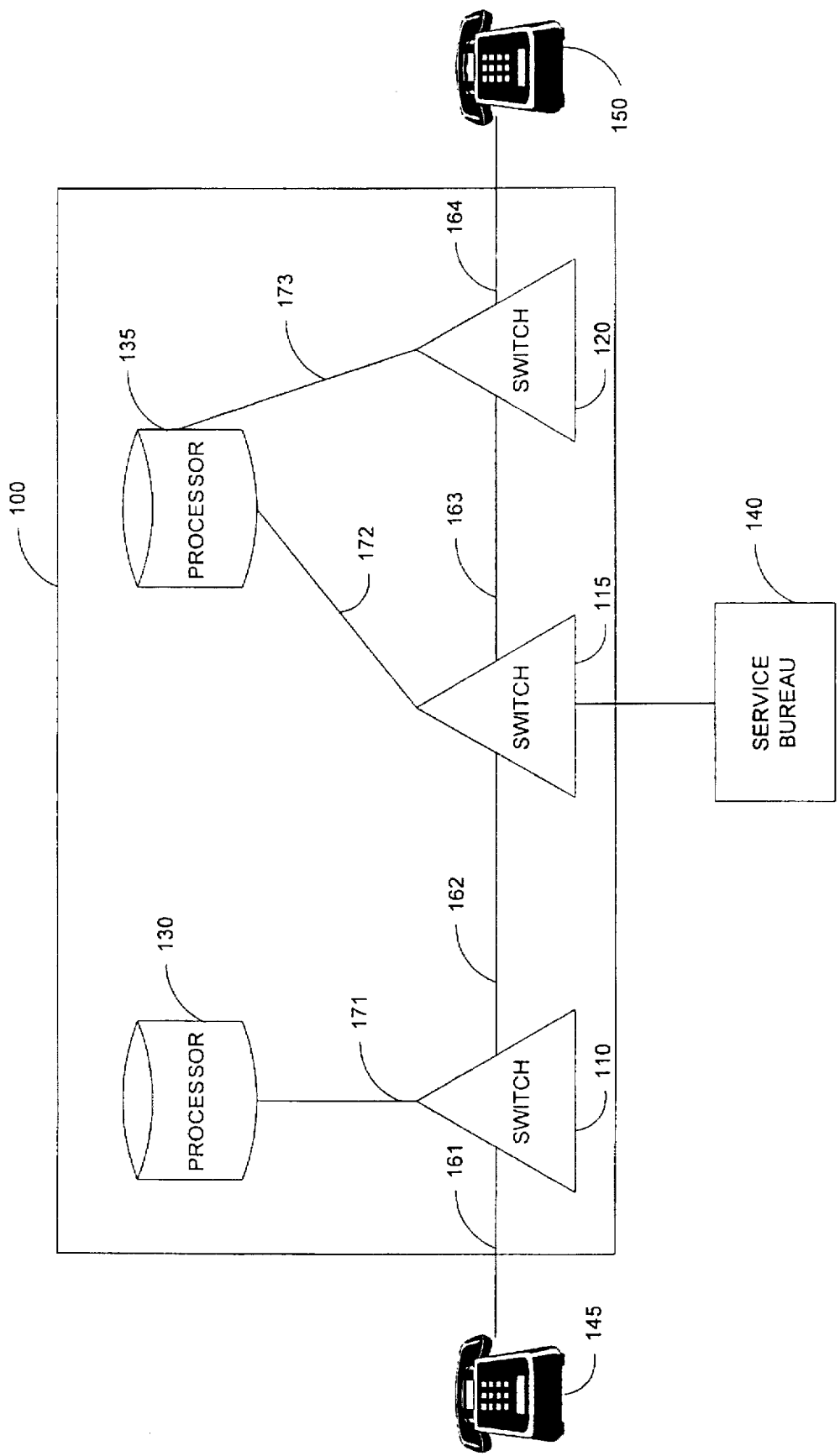
FIG. 1 is a block diagram of a prior art polling system having a centralized system.

Referring to the drawings in greater detail, and initially to FIG. 1, a prior art switching network for conducting a dial-in poll is designated generally by reference numeral 100. Network 100 is exemplary of the existing centralized switching network discussed in detail above. As shown in FIG. 1, network 100 includes a plurality of switches 110, 115 and 120 which are interconnected for routing calls to one another. The connection between switch 110 and switch 115 is represented by a link 162, and the connection between switch 115 and switch 120 is represented by a link 163. Switch 115 is coupled with a service bureau facility 140 via a trunk 165. The switches are supported by processors 130 and 135. Switch 110 is linked to processor 130 by a link 171. Switch 115 and switch 120 are linked to processor 135 by link 172 and link 173 respectively. A conventional telephone 145 is connected to network 100 over a telephone line 161. Likewise, a telephone 150 is connected to network 100 over a telephone line 164. Typically, these telephone connections would pass through a LEC and the LEC would transfer calls and signaling to network 100. The signaling includes call information such as the dialed number and the caller's number. The LECs have been omitted for reasons of clarity.

Service bureau 140 may initiate an opinion poll or other such survey by publicly broadcasting a question followed by a plurality of responses wherein each response is associated with a particular telephone number. If an opinion poll on a controversial topic is broadcast to a national television audience, a large number of telephone calls may be placed over a short time period in response to the poll. Calls from poll participants initially received at switches 110 and 120 will be routed to switch 115 because switch 115 is the designated terminating switch for polling operations in centralized switching network 100. As a result, switches 110 and 120 would query processors 130 and 135 for routing instructions. Processors 130 and 135 would analyze the dialed number and return a translation number to switches 110 and 120 that is used to route the call through switch 115 to service bureau 140.

Both the calls and call information (caller's number and dialed number) would be forwarded from switch 115 to service bureau 140. Service bureau 140 would play an appropriate voice message to the caller. Service bureau 140 would also tally poll results based on the call information.

However, the prior art system may not remain operational if the volume of calls from poll participants exceeds network capacity. The call traffic over the links 162 and 163 may become congested. The capacity of switch 115 may be exceeded. The volume of calls being forwarded over trunk 165 may become too high. In any case, a bottleneck will be created at switch 115 that could potentially tie up the entire network 100.

It is again noted that FIG. 1 represents the prior art. As shown in FIG. 1, network 100 is representative of existing telecommunications networks wherein polling operations are centralized at a relatively small number of switches. Although such networks might include any number of switches, a relatively simple network is shown in FIG. 1 for purposes of illustration and discussion. In a centralized switching network comprising 50 or more switches, for example, several switches may be designated as terminating switches for calls from poll participants. In other words, only a very few of the switches in a centralized network are adapted for terminating calls from poll participants.

Figure 2:
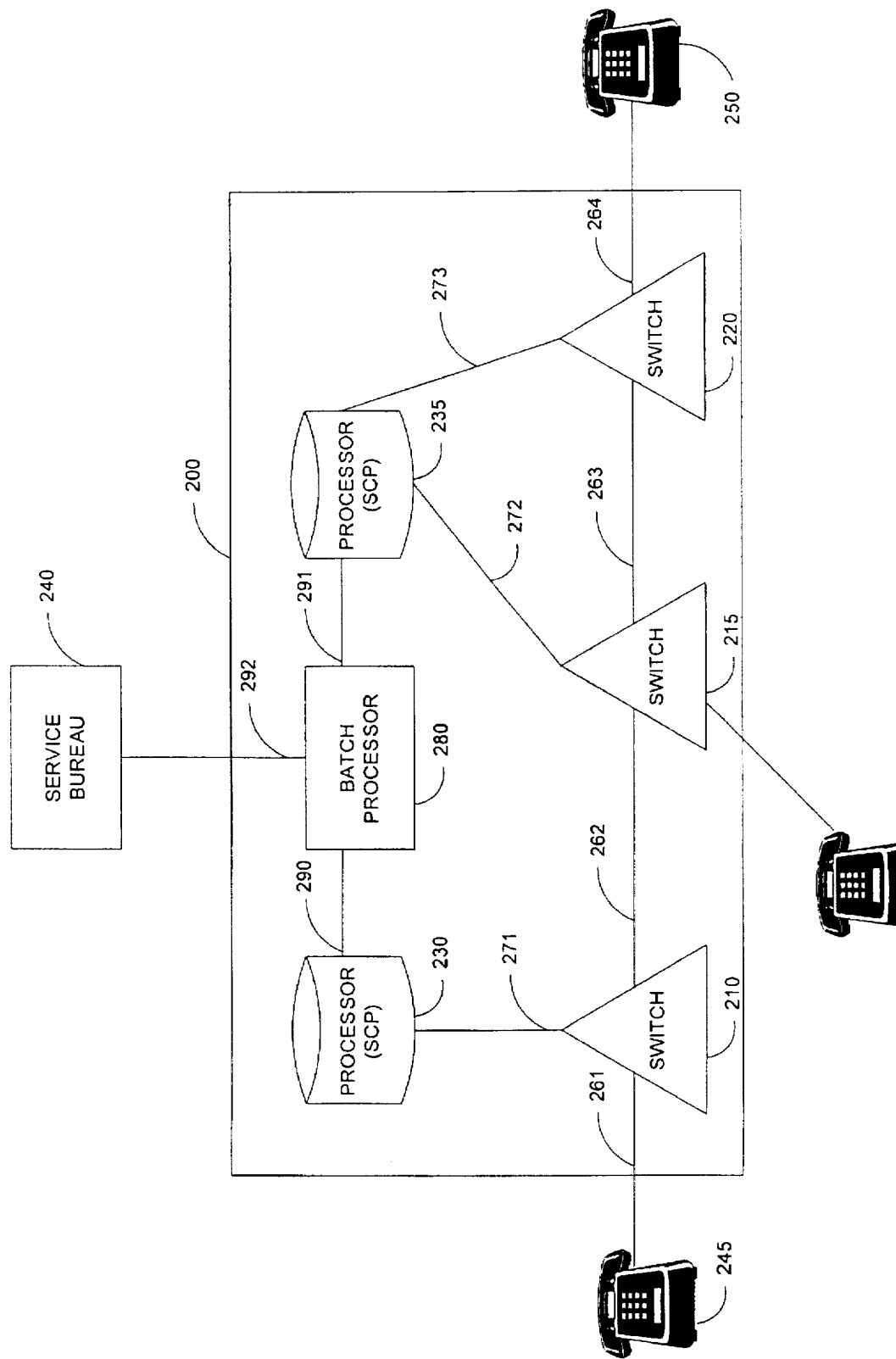
FIG. 2 is a block diagram of a polling system having a distributed polling operation in accordance with a preferred embodiment of the present invention.

Turning now to FIG. 2, a telecommunications network in accordance with a preferred embodiment of the present invention is designated generally by the reference numeral 200. Network 200 includes switches 210, 215, and 220. Switches 210 and 215 may communicate with one another via a link 262, and switches 215 and 220 are coupled with one another via a link 263. Switch 210 is associated with a processor 230, and switches 215 and 220 are associated with a processor 235. Switch 210 communicates with processor 230 over a signaling link 271, and switches 215 and 220 communicate with processor 235 over signaling links 272 and 273, respectively.

Switches 210, 215, and 220 could be any switching platform capable of supporting the requirements of the invention. One example of such a switching platform is the Northern Telecom DMS-250. In a preferred embodiment, switches 210, 215, and 220 have an internal message platform including a Digital Recorder Announcement Module (DRAM) that can store announcements and play them to particular callers. In the DMS-250, this is known as Enhanced Recording Announcement Memory (ERAM), but there are similar systems for other switching platforms. Associated processors 230 and 235 are preferably service control points (SCPs), which may be equipped with an internal clock for providing a time and date stamp for calls. The SCPs may also include one or more counters for counting the number of calls to specific telephone numbers and a polling table for matching dialed numbers with DRAM message identifiers (IDs). For billing purposes, the SCPs might be adapted to create call detail records (CDRs) containing information such as the dialed number, the time and date of the call, the calling number and any other relevant data. Signaling System #7 (SS7) is a presently preferred means for communicating over links 271,272 and 273. If SS7 is used, the signaling between the switches and the SCPs could be Transaction Capabilities Application Part (TCAP) messages. TCAP messaging is well known and readily available, but it has yet to be applied in the context of the invention. As those skilled in the art will appreciate, communications protocols such as TCP/IP or X.25 can be used to transfer the polling data from one device to another.

Since network 200 includes more than one SCP, a batch processor 280 is provided for collecting the polling data from each of the SCPs so that the data may be consolidated at a single network site. Batch processor 280 would not be necessary in a network having only one SCP. As shown in FIG. 2, batch processor 280 is coupled with SCP 230 over datdata link 290 and with SCP 235 over a data link 291. The polling information may then be periodically transferred from processor 280 to a remote computer at a service bureau facility 240 over a data link 292. Alternatively, SCPs 230 and 235 could be provided with separate data links for transferring polling data directly from each SCP to the remote computer at facility 240.

When a service bureau is conducting the poll, the service bureau may further analyze the polling data forwarded from the SCPs to obtain more detailed poll results. Moreover, if the processors in network 200 have already processed the polling data to obtain poll results, facility 240 may be used to store the polling data and/or to compare the polling information with other poll results. Also, the service bureau typically maintains the marketing contacts for conducting the poll and reporting the results of the poll.

Telephone subscribers may access network 200 with a conventional telephone such as telephones 245 and 250. Telephone 245 is coupled with network 200 by a telephone line 261, and telephone 250 is coupled with network 200 by a telephone line 264. Calls to network 200 from poll participants may be received at any of the switches 210, 215, and 220 and may also be terminated at any of these switches. The term "terminated" is used here to mean that the connection for a given call is not extended beyond "terminating" switch. As discussed above, an LEC typically connects the telephones to network 200, but these have been omitted for clarity.

FIG. 2 is representative of a distributed switching network wherein most or all of the switches in the switching network may serve as a terminating switch for calls received in response to a telephone poll. Accordingly, if a service bureau were to prompt callers to dial any one of a plurality of different telephone numbers to select a specific response to a particular question, a call directed to network 200 in response to the polling operation will terminate at the originating switch for that call. This feature of the present invention significantly reduces call traffic between switches because calls from poll participants are not routed to any other switch. By contrast, calls from poll participants directed to prior art network 100 rapidly consume network capacity since these calls are typically routed from their originating switch to at least one other switch.

For example, when caller A at telephone 245 dials one of the assigned telephone numbers (e.g., 800-123-1111), the call will be received at switch 210 via link 261. Switch 210 sends a message to SCP 230 indicating the telephone number dialed by caller A (800-123-1111). Note that only a signaling message for the call is sent and the caller is not connected to SCP 230. SCP 230 is programmed to return a message ID for each dialed number it receives from switch 210. Typically, the message ID will be the same for callers dialing the same telephone number, but the message ID is typically different for callers dialing different telephone numbers. After switch 210 receives the message ID from SCP 230, the switch plays the prerecorded message indicated by the message ID. An exemplary message might be "Thank you for your 'yes' vote."

Likewise, caller B at telephone 250 may participate in the poll by dialing a different one of the responsive telephone numbers (e.g., 800-123-2222). The call from caller B will be received at switch 220 over telephone line 264. Switch 220 will relay the dialed number (800-123-2222) to SCP 273, which will respond to switch 220 with a corresponding message ID. Switch 220 will then play a prerecorded voice message over line 264 to caller B in accordance with the message ID received from SCP 235. In this instance, the message might be "Thank you for your 'no' vote." Although not necessary, a confirmation message thanking the caller for participating in the poll is often desirable because it assures the caller that their response has been recorded. Otherwise, callers might assume that their first call did not reach its destination, and they may call the telephone number again.

The use of associated processors in accordance with the present invention significantly reduces the potential for bottlenecks in the network. Each SCP 230 and 235 has a memory that can record each of the dialed numbers relayed from switches 210, 215, and 220, and SCPs 230 and 235 may selectively store other polling information associated with the calls as described below. The data resulting from the polling operation may be transferred from SCPs 230 and 235 to service bureau facility 240 over data links. In this way, call information for analyzing the results of the survey or poll is directed to service bureau facility 240, but the call is not actually routed to facility 240. Thus, the present invention avoids the need for an expensive trunk coupling each terminating switch with the service bureau. Therefore, the potential for congestion over trunk 165 (FIG. 1) has been eliminated in the present invention.

Although switches 215 and 220 share a single SCP 235 in FIG. 2, those skilled in the art will understand that various alternative configurations are encompassed by the present invention. For example, providing a separate SCP for each switch is clearly within the scope of the present invention. Such a modification would still require forwarding the data stored at each of the SCPs to service bureau 240. This could be accomplished by combining the survey results within the network 200 at processor 280 before forwarding the results to service bureau 240, or separate data links could be provided between service bureau 240 and each of the SCPs. Those skilled in the art will readily appreciate many ways in which the poll results may be transferred to the service bureau 240 or to another entity.

Network 200 may also be adapted to capture additional polling information. As each call is received, the time of day and/or date of the call may be recorded. Further, the caller's telephone number may be recorded either by prompting the caller to enter the telephone number using the keys on the telephone keypad or automatically by utilizing Automatic Number Identification (ANI) capability. Similarly, additional demographic information may be obtained by prompting the caller with menu options such as "Press '1' if you are a male, and press '2' if you are a female." Additionally, a single "800" number could be used for the poll and "press one to vote yes" or "press two to vote no" prompts and be used for polling with the responses tabulated accordingly. Some systems capable of voice storage may even prompt callers to leave a voice message indicating their response and/or leave personal information such as the caller's address. Those skilled in the art will appreciate that the present invention not only encompasses a relatively simple polling operation which tallies votes based on the number of calls received, but also contemplates a relatively sophisticated polling operation in which calls may be screened and callers may provide detailed information. The ANI capability mentioned above is a convenient means for screening calls. For example, a poll may be designed to exclude callers from certain area codes or to limit each calling number to one o response. This may be accomplished by ANI testing of the caller's telephone number prior to recording a response. Similarly calls may be screened by time and date or by the number of calls received in response to the poll.

Sometimes it may be important to limit the number of calls that will be accepted in response to a poll. As an example, a marketing company may sponsor a nationwide dial-in poll which prompts callers to dial certain 800 numbers so that the callers will not have to pay to participate in the poll. However, the sponsor must pay for each call to the 800 numbers associated with the poll, and the sponsor may want to have some control over the cost of sponsoring the dial-in poll. Moreover, the sponsor may determine that the poll results will be reliable and that ample demographic information will be obtained if a total of five million callers participate in the poll. Accordingly, the sponsor may want to cap participation in the poll at five million responses so that the poll will be conducted as efficiently as possible.

The present invention provides a call capping feature by adapting the counter means in the associated processor to track the total number of calls received in response to the poll. This may be accomplished either by independently counting the total number of calls or by summing the number of calls to each of the telephone numbers associated with the poll. In any event, the call capping feature gives the sponsor some control over the scope and cost of the dial-in poll.

The counter means may also be programmed to record the number of calls placed to the polling telephone numbers before and/or after the polling period. This type of information may be useful to the poll sponsor because it indicates the callers' level of interest in the subject matter of the poll. For example, a sponsor who caps a poll at five million calls may be interested to know that ten million more calls were received after reaching the cap. Regardless of whether the calls placed before or after the polling period are counted, an explanatory message may be provided for callers placing a call after the cap is met. Of course, these calls may also be terminated without any message for the caller.

The counter means may also be adapted to identify a caller having particular significance. For example, the sponsor of a poll may encourage participation in the poll by announcing that the 40,000th caller will win an automobile. Thus, the ability to keep track of the number of calls received overall and/or the number of calls received for each telephone number may be enhanced by identifying a particular caller as having special status. When calls are received from callers having particular significance (e.g., the 40,000th caller), such callers will typically receive an additional voice message informing them of their special status.

Regardless of the sophistication of the polling operation, the poll results are typically provided in a graphical format. If, for example, the poll is promoted on a particular television program, the results will often be broadcast on television as well. The poll results may be visually displayed in bar graphs, pie charts or any other user-friendly format available to those skilled in the art. Preferably, the selected format will be compatible for display on a monitor such as a television or computer monitor.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

We claim:

1. A method for operating a telecommunications network to conduct a poll wherein the poll has at least two possible responses and wherein each response is associated with a unique telephone number, wherein a caller selects one of the responses to the poll by selecting the telephone number that is associated with the selected response, wherein the caller participates in the poll by placing a telephone call to the selected telephone number, the method comprising:

receiving the telephone call into a switch in the telecommunications network wherein the call is placed by the caller using the selected telephone number that is associated with the selected response to the poll, wherein the switch is the only device in the telecommunications network to receive and perform call processing on the call, and wherein the call is not routed from the switch;

receiving information into the switch indicating the selected telephone number used by the caller to place the call and participate in the poll;

directing information from the switch to a processor in the telecommunications network indicating the selected telephone number used by the caller to place the call and participate in the poll; and in the processor, using the information indicating the selected telephone number used by the caller to place the call and participate in the poll to provide a count of calls placed to the selected telephone number.

2. The method of claim 1, further comprising:

in the processor, selecting a message identifier based on the selected telephone number used by the caller to place the call and participate in the poll;

transmitting the message identifier from the processor to the switch; and in the switch, playing a message to the caller based on the message identifier.

3. The method of claim 2, wherein the message indicates the caller's selected response to the poll.

4. The method of claim 1, further comprising receiving information into the switch indicating a telephone number of the caller.

5. The method of claim 4, further comprising limiting participation in the poll based on at least a portion of the telephone number of the caller.

6. The method of claim 1, further comprising limiting participation in the poll based on a time of the call.

7. The method of claim 1, further comprising limiting participation in the poll based on a total number of calls to the poll.

8. The method of claim 1, further comprising displaying results of the poll in a graphical format.

9. The method of claim 8, wherein the graphical format is displayed on a monitor.

10. The method of claim 1 wherein the call is a toll-free call.

11. The method of claim 1 wherein the call is a "900" call.

12. A telecommunications system for conducting a poll wherein the poll has at least two possible responses and wherein each response is associated with a unique telephone number, wherein callers select responses to the poll by selecting the telephone numbers that are associated with the selected responses, wherein the callers participate in the poll by placing telephone calls to the selected telephone numbers, the telecommunications system comprising:

- a plurality of switches wherein each switch is operational to receive the telephone calls that are placed by the callers using the selected telephone numbers that are associated with the selected responses to the poll, wherein each one of the switches that receives one of the calls is operational to transmit information indicating the selected telephone number used to place that call, and wherein each one of the switches that receives one of the calls is the only device in the telecommuniations system to receive and perform call processing on that call, and wherein that call is not routed from that switch; and
- a plurality of processors that are linked to the switches and that are operational to receive the information from the switches indicating the selected telephone numbers used by the callers to place the calls and to provide a count of calls placed to each of the selected telephone numbers.

13. The system of claim 12 further comprising a batch processor that is linked to the processors and that is operational to collect poll results from the processors, wherein the processors are each operational to provide the poll results to the batch processor.

14. The system of claim 12 wherein the telecommunications system is in an interexchange carrier.

15. The system of claim 12 wherein the processors are Service Control Points.

16. The system of claim 12 wherein the processors are linked to the switches using Signaling System #7.

17. A telecommunications system for conducting a poll wherein the poll has at least two possible responses and wherein each response is associated with a unique telephone number, wherein callers select responses to the poll by selecting the telephone numbers that are associated with the selected responses, wherein the callers participate in the poll by placing telephone calls to the selected telephone numbers, the telecommunications system comprising:

- a plurality of switches wherein each switch is operational to receive the telephone calls that are placed by the callers using the selected telephone numbers that are associated with the selected responses to the poll, wherein each one of the switches that receives one of the calls is operational to transmit information indicating the selected telephone number used to place that call, and wherein each one of the switches that receives one of the calls is the only device in the telecommunications system to receive and perform call processing on that call, and that call is not routed from that switch;
- a plurality of processors that are linked to the switches and that are operational to receive the information from the switches indicating the selected telephone numbers used by the callers to place the calls and to provide a count of calls placed to each of the selected telephone numbers; and
- a batch processor that is linked to the processors and that is to collect from each of the processors the count of calls placed to each of the selected telephone numbers.

* * * * *